United States Patent [19]

Berteleau et al.

[11] Patent Number: 5,723,812
[45] Date of Patent: Mar. 3, 1998

US005723812A

[54] STABILIZED AMMONIUM NITRATE

[75] Inventors: Gérard Berteleau, Ris Orangis; Jean-Claude Mondet, Vert le Grand, both of France

[73] Assignee: Societe Nationale des Poudres et Explosifs, Cedex, France

[21] Appl. No.: 789,207

[22] Filed: Jan. 24, 1997

[30] Foreign Application Priority Data

Jan. 24, 1996 [FR] France ................... 96-00778

[51] Int. Cl.$^6$ ................................ C06B 31/028
[52] U.S. Cl. ................................ 149/46; 149/61
[58] Field of Search ........................... 149/46–61

[56] References Cited

U.S. PATENT DOCUMENTS

| | | | |
|---|---|---|---|
| 3,018,164 | 1/1962 | Guth. | |
| 4,063,975 | 12/1977 | Fossan et al. | 149/65 |
| 4,124,368 | 11/1978 | Boyars. | |
| 4,265,406 | 5/1981 | Palgrave et al. | 149/46 |
| 4,367,104 | 1/1983 | Paton et al. | 149/46 |
| 4,384,903 | 5/1983 | Enever | 149/61 |
| 4,401,490 | 8/1983 | Alexander et al. | 149/46 |
| 5,456,775 | 10/1995 | Schapira et al. | 149/46 |
| 5,545,272 | 8/1996 | Poole et al. | 149/48 |
| 5,641,938 | 6/1997 | Holland et al. | 149/48 |

FOREIGN PATENT DOCUMENTS

| 627680 | 9/1949 | United Kingdom. |
|---|---|---|
| 2112372 | 7/1983 | United Kingdom. |

*Primary Examiner*—Edward A. Miller
*Attorney, Agent, or Firm*—Cushman Darby & Cushman IP Group Pillsbury Madison & Sutro LLP

[57] ABSTRACT

The invention relates to stabilized ammonium nitrate which no longer exhibits a transition point at 32° C.

Its subject-matter is a new process for stabilizing ammonium nitrate and the new stabilized ammonium nitrate thus obtained.

The stabilized ammonium nitrate according to the invention includes between 1% and 7% by weight of potassium nitrate and between 0.1% and 1% by weight of an organic dye containing at least one arylsulphonate group chosen from the class consisting of benzenesulphonate groups and naphthalenesulphonate groups.

The stabilization of ammonium nitrate is necessary particularly for its use in propellants.

10 Claims, No Drawings

5,723,812

STABILIZED AMMONIUM NITRATE

The present invention relates to stabilized ammonium nitrate.

It belongs essentially to the field of pyrotechnics, more particularly to that of propellants.

Ammonium nitrate, a compound which is low in cost and relatively insensitive to external attacks, has for a long time been employed as an explosive or oxidizing charge in pyrotechnic compositions.

It cannot, however, be employed as it is in propellent or explosive compositions because of the existence of a transition point at 32° C., with change in crystalline form accompanied by a change in volume, which gives rise to losses of cohesion when formulated materials are subject to temperature cycles.

The metal oxides which are generally recommended to overcome this disadvantage, such as ZnO, NiO or CuO, do not permit a satisfactory solution to the problem, because their presence entails other disadvantages, such as toxicity, limited pot life or worsened hygroscopicity.

It is also well known to a person skilled in the art that the presence of potassium nitrate, as a solid solution with the ammonium nitrate, allows the abovementioned transition point to be eliminated, but it becomes effective only from a proportion of approximately 10% onwards, and this considerably reduces the performance of the energetic material.

U.S. Pat. No. 3,018,164 proposes a method making it possible to stabilize ammonium nitrate, that is to say to eliminate the abovementioned transition point at 32° C., using the presence of potassium nitrate in contents which are lower than 8%, preferably between 3.3 and 5%.

However, this method comprises numerous stages, some of which are complex. It is lengthy, costly and difficult to extrapolate to an industrial scale.

The person skilled in the art is consequently still searching for a truly satisfactory solution in order to stabilize ammonium nitrate, that is to say particularly a solution which does not introduce other disadvantages, such as those referred to above, which are just as awkward as that which has been overcome.

The present invention proposes such a solution.

It has been discovered, very surprisingly, that the presence of a very small quantity, for example 0.2%, of certain organic dyes used in combination with potassium nitrate, allows the transition point of ammonium nitrate at 32° C. to be eliminated with only a few %, for example 2% or 3%, of potassium nitrate, whereas this result is usually obtained with a potassium nitrate ratio of 10% to 15%.

The advantage of the invention is obvious:

the ratio of 3% of $KNO_3$ is the same as that of the usually recommended metal oxide additives (ZnO, NiO, CuO, etc.), but without the abovementioned disadvantages linked with the presence of these oxides.

A content of a few parts per thousand of organic additive makes it possible to remain below the threshold above which ammonium nitrate is considered to present a hazard (0.2% of carbon).

The method of stabilization is very simple, low in cost and can be easily extrapolated to an industrial scale. It suffices to add the dye during the production, in solution or in melt, of the $KNO_3$—$NH_4NO_3$ mixture.

It has additionally been found, just as surprisingly, that ammonium nitrate stabilized in this way loses its residual water more easily and that a crude pulverulent synthetic product is obtained directly which is sufficiently dry (water content lower than 0.04%) not to agglomerate in storage.

It is well known to a person skilled in the art to add to ammonium nitrate facies modifiers of the dye type containing a sulphonated aromatic group.

French Patent No. 59432 of addition to Patent FR 1 004 894 describes, for example, such an application.

While facies modifiers have an effect on the form of the crystals obtained on recrystallization by being absorbed on some faces, which stops the growth, and are employed, especially in ammonium nitrate, as anticaking agents, a possible influence of such compounds, alone or in combination with others, on the 32° C. transition point of ammonium nitrate has not been described or suggested in any way.

The subject-matter of the present invention is therefore first of all a new ammonium nitrate stabilized with potassium nitrate, characterized in that it includes between 1% and 7% by weight of potassium nitrate and between 0.1% and 1% by weight of an organic dye containing at least one arylsulphonate group chosen from the class consisting of the benzenesulphonate groups and the naphthalenesulphonate groups.

In general, organic dyes are organic chemical compounds which absorb unequally the various radiations in the visible spectrum. They are well known to a person skilled in the art, especially the diazo derivatives and the arylsulphone derivatives, like acid magenta.

Unless stated otherwise, the percentages referred to in the present application are to be understood to relate to stabilized ammonium nitrate, that is to say to the ammonium nitrate-potassium nitrate-dye mixture.

Bearing in mind the very small quantity of dye and the small quantity of $KNO_3$ it will be possible, to a first approximation, also to consider the same percentages relating to the $KNO_3$—$NH_4NO_3$ mixture and, to a second approximation, also to consider the same percentages relative to $NH_4NO_3$ alone.

The $KNO_3$ content is preferably between 2% and 5% by weight, still better between 2.5% and 3.5%, for example approximately 3% by weight.

Also preferably, the organic dye content is between 0.15% and 0.5% by weight, for example approximately 0.2% by weight.

According to a preferred alternative form the organic dye comprises a number, preferably 2 or 3, of arylsulphonate groups.

Although it may be possible for the same dye to contain one or more benzenesulphonate groups and one or more naphthalenesulphonate groups, a dye is generally employed which contains only arylsulphonate groups of the same kind, benzenesulphonate groups or naphthalenesulphonate groups.

According to another preferred alternative form the benzenesulphonate groups are benzenemonosulphonate groups and the naphthalenesulphonate groups are naphthalenemonosulphonate or naphthalenedisulphonate groups. These groups may also include other groups, such as hydroxyl, amine, ammonium and alkyl, for example methyl or ethyl, groups.

The sulphonate group(s) may be in any position on the aromatic ring.

According to another preferred alternative form the arylsulphonate group is an ammonium arylsulphonate group or, better still, a sodium arylsulphonate group.

Within the scope of the present invention the particularly preferred organic dyes are acid magenta, also called rubin S, which is a trisulphonated fuchsin derivative, and the formula of which is:

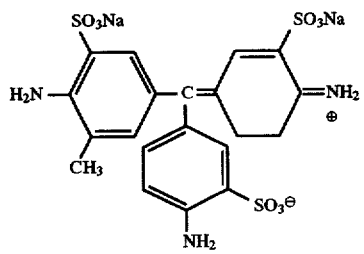

and amaranth, of formula:

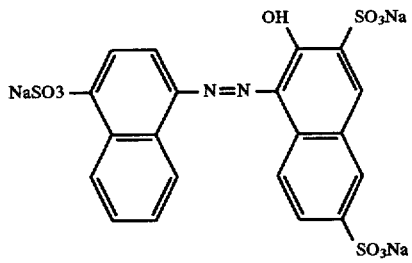

To obtain the stabilized ammonium nitrate according to the invention it is possible, for example, to incorporate the potassium nitrate and the organic dye into the ammonium nitrate either by mixing into the molten ammonium nitrate or by converting the constituents into an aqueous solution, followed by evaporation of the water.

Within the scope of conventional evaporation, or according to the method using melting, the solid product obtained must next be ground to obtain the desired particle size.

It is also possible, this being preferred, to spray the aqueous solution as an aerosol, and then to obtain a powder directly by drying this aerosol.

As a result of the above, another subject-matter of the present invention is a new process for eliminating the 32° C. transition point of ammonium nitrate by incorporation of potassium nitrate, characterized by incorporating between 1% and 7% by weight of potassium nitrate and between 0.1% and 1% by weight of an organic dye containing at least one arylsulphonate group chosen from the class consisting of benzenesulphonate groups and naphthalenesulphonate groups.

This new process makes it possible to obtain the new stabilized ammonium nitrate according to the invention.

The following nonlimiting examples illustrate the invention and the advantages which it provides.

EXAMPLES 1 TO 4

Ammonium nitrate stabilized with potassium nitrate and acid magenta—Method using melting.

Example 1

100 g of ammonium nitrate are placed in a 100-ml thermostatic reactor equipped with magnetic stirring, a temperature probe, a nitrogen purge and a bottom valve, and are then melted and then 3.10 g of potassium nitrate and 0.2 g of acid magenta are poured in.

After dissolving and after a purple-coloured clear solution has been obtained, the stirring is continued for 0.5 h and then the solution is cast onto a metal plate by means of the bottom valve.

After cooling under a nitrogen atmosphere, the solid product is ground.

Its water content is 0.027%.

Dilatometric analysis, consisting in suspending a sample in powder form in xylene and measuring the change in the volume of this sample while the temperature is being increased between the ambient temperature and 80° C., shows the elimination of the transition point at 32° C., with an absence of other transition points in the temperature region in question.

Examples 2 to 4

Strictly the same procedure as in Example 1 was followed, but with different quantities of potassium nitrate and/or of acid magenta:

Example 2: 3.10 g of potassium nitrate and 0.5 g of acid magenta

Example 3: 5.3 g of potassium nitrate and 0.2 g of acid magenta

Example 4: 5.3 g of potassium nitrate and 0.5 g of acid magenta

As in Example 1, the dilatometric analysis shows, in the case of these Examples 2 to 4, the elimination of the transition point at 32° C. and the absence of other transition points in the temperature range in question.

In the case of the product in Example 2, a differential thermal analysis (DTA) was also carried out, between −60° C. and +180° C., at a rate of 5° C./min; when compared with the same analysis performed, on the one hand, on pure ammonium nitrate and, on the other hand, on a mixture of 100 g of ammonium nitrate and 3.10 g of potassium nitrate, this shows virtual elimination of the transition point at 32° C.

It should be noted that mere presence of 3.10 g of $KNO_3$ in 100 g of ammonium nitrate has only little effect on the 32° C. transition point of pure ammonium nitrate.

Furthermore, the water content of the ground product obtained is 0.039% in the case of Example 2, 0.023% in the case of Example 3 and 0.034% in the case of Example 4.

Comparative Examples A, B, C, D, E, F and G

These comparative examples do not form part of the invention. They were carried out only with the aim of showing the ease of drying of the stabilized ammonium nitrate according to the invention, when compared with the known ammonium nitrate, stabilized with potassium nitrate or containing a sulphonated dye as facies modifier.

In the case of these comparative examples strictly the same procedure as in the case of Example 1 was followed, but in the case of Comparative Examples A, B, C and D there is no acid magenta and, in the case of Examples E, F and G, there is no potassium nitrate.

In addition, in the case of Comparative Examples B, C and D, the quantity of ammonium nitrate is 5.3 g, 8.7 g and 11.1 g respectively instead of 3.1 g and, in the case of Comparative Examples E, F and G, the quantity of acid magenta is 0.1 g, 0.3 g and 0.5 g respectively, instead of 0.2 g.

The water content of the ground product obtained is the following:

Comparative Example A: 0.13%

Comparative Example B: 0.10%

Comparative Example C: 0.11%

Comparative Example D: 0.11%

Comparative Example E: 0.079%

Comparative Example F: 0.080%

Comparative Example G: 0.066%

If a comparison is made with the low water content (0.027% to 0.039%) of the products obtained according to the invention in Examples 1 to 4, an effect of synergy is found on the ease of drying when the dye and the potassium nitrate are present simultaneously, whereas the presence of either one does not provide this technical effect.

Examples 5 to 13

Ammonium nitrate stabilized with potassium nitrate and amaranth—Method using spraying of an aqueous solution.

An aqueous solution of ammonium nitrate containing 50% by weight is prepared, to which the potassium nitrate and the amaranth are added in the following respective weight ratios relative to the ammonium nitrate:

Example 5: 2% and 0.2%

Example 6: 2% and 0.3%

Example 7: 2% and 0.5%

Example 8: 3% and 0.2%

Example 9: 3% and 0.3%

Example 10: 3% and 0.5%

Example 11: 5% and 0.2%

Example 12: 5% and 0.3%

Example 13: 5% and 0.5%

The solution is introduced into a sprayer with the aid of a peristaltic pump at a rate of 800 ml/h.

The nitrogen pressure employed for spraying the solution is $3 \cdot 10^5$ Pa (3 bar) and the pressure in the whole apparatus, controlled by a suction device, is $0.24 \cdot 10^5$ Pa (0.25 bar), that is to say that the apparatus is at a reduced pressure relative to the atmospheric pressure.

The temperature of the carrier air for drying the aerosol is controlled at 150° C. and that at the exit (air laden with product particles) is controlled at 100° C.

The stabilized ammonium nitrate in powder form is next separated from the carrier air in a cyclone and recovered at the bottom of the cyclone.

The dilatometric analysis performed as mentioned in the case of Examples 1 to 4 shows, in the case of all the Examples 5 to 13, the elimination of the transition point at 32° C. and the absence of other transition points in the temperature range in question.

In the case of Example 10, a differential thermal analysis was also carried out, between −60° C. and +180° C., at a rate of 5° C./min, showing the absence of any transition point in the range −60° C./+100° C., and hence the elimination of the transition point at 32° C., whereas the same analysis clearly shows this transition point, when performed in the same operating conditions on pure ammonium nitrate or on a mixture of ammonium nitrate +3% $KNO_3$.

We claim:

1. Ammonium nitrate stabilized with potassium nitrate, characterized in that it includes between 1% and 7% by weight of potassium nitrate and between 0.1% and 1% by weight of an organic dye containing at least one arylsulphonate group chosen from the class consisting of benzenesulphonate groups and naphthalenesulphonate groups.

2. Stabilized ammonium nitrate according to claim 1, characterized in that it includes between 2% and 5% by weight of potassium nitrate and between 0.15% and 0.5% by weight of the organic dye.

3. Stabilized ammonium nitrate according to claim 1, characterized in that the organic dye contains 2 or 3 arylsulphonate groups.

4. Stabilized ammonium nitrate according to claim 1, characterized in that the benzenesulphonate groups are benzenemonosulphonate groups and in that the naphthalenesulphonate groups are naphthalenemonosulphonate or naphthalenedisulphonate groups.

5. Stabilized ammonium nitrate according to claim 1, characterized in that the arylsulphonate group is a sodium arylsulphonate group.

6. Stabilized ammonium nitrate according to claim 1, characterized in that the organic dye is acid magenta or amaranth.

7. Process for eliminating the 32° C. transition point of ammonium nitrate by incorporation of potassium nitrate, characterized by incorporating between 1% and 7% by weight of potassium nitrate and between 0.1% and 1% by weight of an organic dye containing at least one arylsulphonate group chosen from the class consisting of benzenesulphonate groups and naphthalenesulphonate groups.

8. Process according to claim 7, characterized in that the incorporation of potassium nitrate and of the organic dye is performed by mixing into molten ammonium nitrate.

9. Process according to claim 7, characterized in that the incorporation is performed by converting the constituents into aqueous solution and then evaporating the water.

10. Process according to claim 9, characterized in that the aqueous solution is sprayed and then the aerosol thus obtained is dried.

* * * * *